US012729583B1

(12) United States Patent
Burris

(10) Patent No.: US 12,729,583 B1
(45) Date of Patent: Sep. 8, 2026

(54) HYDRAULIC GATE CLOSURE DEVICE

(71) Applicant: Bryan Burris, Snohomish, WA (US)

(72) Inventor: Bryan Burris, Snohomish, WA (US)

( * ) Notice: Subject to any disclaimer, the term of this patent is extended or adjusted under 35 U.S.C. 154(b) by 0 days.

(21) Appl. No.: 19/265,029

(22) Filed: Jul. 10, 2025

(51) Int. Cl.
*E06B 11/02* (2006.01)
*E06B 11/04* (2006.01)

(52) U.S. Cl.
CPC ............ *E06B 11/02* (2013.01); *E06B 11/022* (2013.01); *E06B 11/04* (2013.01); *E05Y 2900/40* (2013.01)

(58) Field of Classification Search
CPC . E06B 9/04; E06B 11/02; E06B 11/04; E06B 11/022; E06B 11/023; E06B 11/027; E06B 11/208; E06B 2009/002; E05Y 2900/40; E04H 17/22; E05F 15/53; E05F 1/08; E05F 1/1016
See application file for complete search history.

(56) References Cited

U.S. PATENT DOCUMENTS 1,543,199 A * 6/1925 Winebrake ............ E06B 11/023 49/73.1
1,763,414 A * 6/1930 Adams .................... E06B 11/02 49/131
2,805,046 A * 9/1957 Petterson .................. E04H 4/06 256/25
2,925,674 A 2/1960 Madden
3,049,827 A * 8/1962 Rascov ................... E06B 11/02 49/364
3,429,074 A * 2/1969 Horton .................... E06B 11/02 49/265
3,490,175 A * 1/1970 Romberg .................. E05F 3/04 16/75
3,699,615 A 10/1972 Duncan
4,576,508 A * 3/1986 Dickinson ............. E01F 13/046 404/11
4,638,597 A * 1/1987 Lybecker ................ E06B 11/02 49/357
4,667,440 A * 5/1987 Grace, Sr. ............... E05F 1/066 49/357
4,715,742 A * 12/1987 Dickinson ............. E01F 13/046 404/6
4,922,655 A * 5/1990 Seal ........................ E06B 11/02 160/331
5,722,114 A 3/1998 Lapp, Jr.
5,987,816 A * 11/1999 Fischer ................... E01F 13/06 404/6
6,227,523 B1 * 5/2001 Haberlen .............. E01F 13/048 246/127

(Continued)

FOREIGN PATENT DOCUMENTS

WO WO2005042892 5/2005

*Primary Examiner* — Justin B Rephann

(57) ABSTRACT

A hydraulic gate closure device includes a vault that is buried underground. A junction box is positioned in the vault and a closer is positioned in the junction box. The closer has a knob which is rotatably integrated into the closer. The knob is biased to rotate in a first direction and the knob is rotatable in a second direction. A pole is coupled to and extends upwardly from the junction box and a stanchion is vertically oriented on the ground. A gate is coupled to the knob of the closer and the gate is located between the stanchion and the pole. The gate is positioned in a closed position when the knob is biased to rotate in the first direction and the gate is urgeable into an open position.

15 Claims, 5 Drawing Sheets

(56) References Cited

U.S. PATENT DOCUMENTS

| | | | | |
|---|---|---|---|---|
| D536,100 | S | 1/2007 | Svedberg | |
| 7,516,519 | B2 | 4/2009 | Talpe | |
| 8,033,053 | B2 * | 10/2011 | Anderson | E01F 13/048 404/6 |
| 8,656,554 | B1 | 2/2014 | Burleson | |
| 9,334,670 | B2 * | 5/2016 | Cowie | E04H 4/06 |
| 9,909,271 | B2 * | 3/2018 | Wiegel | E01F 15/003 |
| 11,795,732 | B2 | 10/2023 | Adams | |
| 2007/0221904 | A1 * | 9/2007 | Stull | E06B 11/02 256/73 |
| 2009/0139144 | A1 * | 6/2009 | Gill | E06B 11/02 49/168 |
| 2011/0197526 | A1 * | 8/2011 | Thomas | E06B 11/02 52/848 |
| 2012/0279146 | A1 * | 11/2012 | Thomas | E06B 11/02 52/126.1 |
| 2026/0022584 | A1 * | 1/2026 | Talpe | E04H 17/22 |

* cited by examiner

HYDRAULIC GATE CLOSURE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gate closure devices and more particularly pertains to a new gate closure device for closing a gate in a slow and controlled manner. The device includes a vault that is buried in the ground and a junction box that is positioned in the vault. The device includes a closer that is positioned in the junction box and a pole that is mounted to the junction box. The device includes a gate that is pivotally attached to the pole and the gate is coupled to the closer. The closer biases the gate to swing into a closed position in a slow and controlled manner.

(2) Description of Related Art Including Information Disclosed Under 37 CFR 1.97 and 1.98

The prior art relates to gate closure devices including: an automatic gate device that includes a pair of gates and a pair of cam rods coupled to a respective gate and a treadle member extending between the pair of cam rods which automatically biases the gates into a closed position; a gate closure device that includes a compression spring mechanism that is integrated into a swinging gate to bias the swinging gate into a closed position; an adjustable self-closing hinge device that includes a torsion spring and a screw for tightening or loosening the torsion spring; A gate closer that includes a torsion spring and a pulley and a cable which is attached between the torsion spring and a gate for biasing the gate into a closed position. In no instance does the prior art disclose a hydraulic gate closure device that includes a vault which is buried and a closer that is positioned in the vault and a gate that is coupled to the closer such that the closer is biased to swing the gate into a closed position.

BRIEF SUMMARY OF THE INVENTION

An embodiment of the disclosure meets the needs presented above by generally comprising a vault that is buried underground. A junction box is positioned in the vault and a closer is positioned in the junction box. The closer has a knob which is rotatably integrated into the closer. The knob is biased to rotate in a first direction and the knob is rotatable in a second direction. A pole is coupled to and extends upwardly from the junction box and a stanchion is vertically oriented on the ground. A gate is coupled to the knob of the closer and the gate is located between the stanchion and the pole. The gate is positioned in a closed position when the knob is biased to rotate in the first direction and the gate is urgeable into an open position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
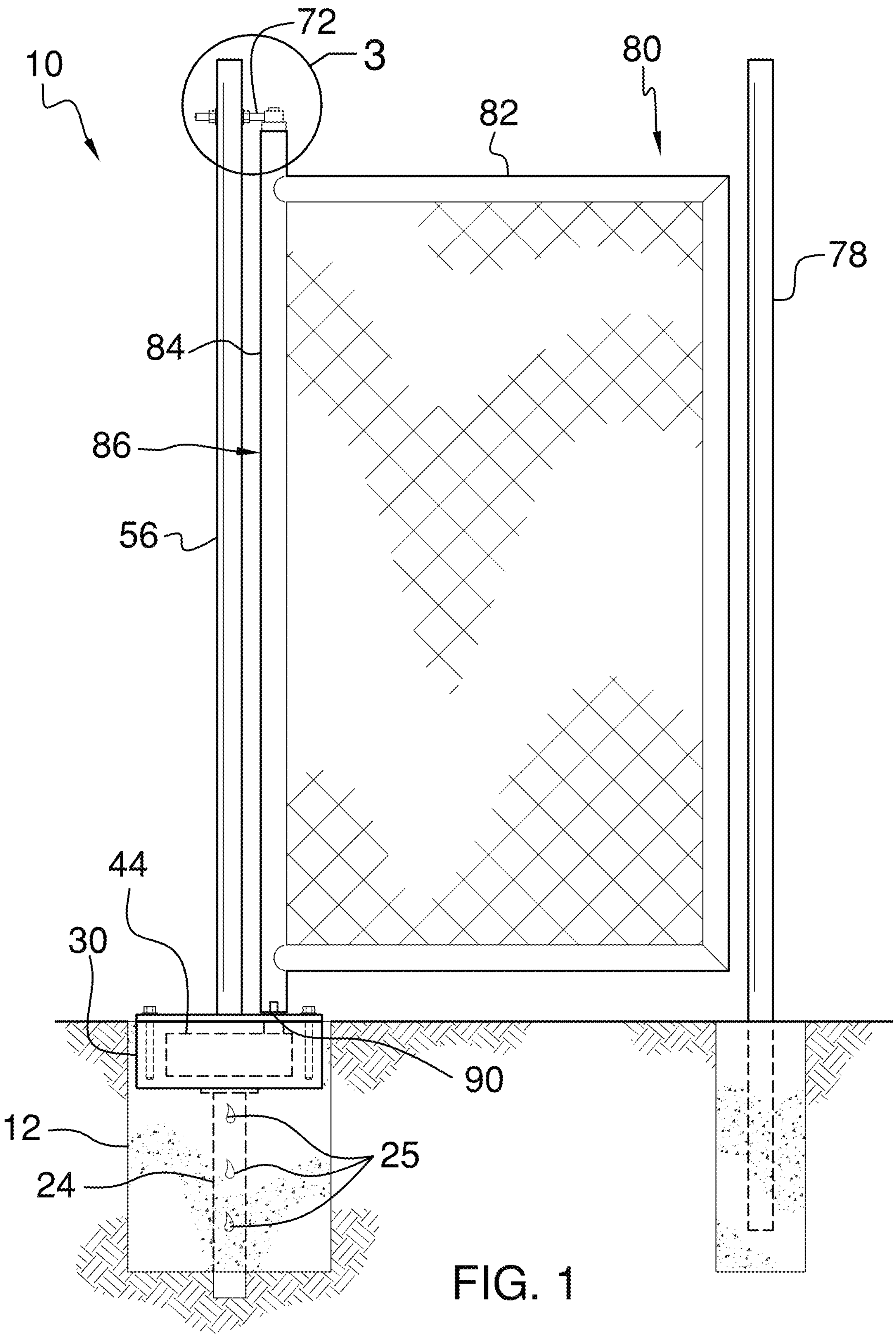
FIG. 1 is a perspective view of a hydraulic gate closure device according to an embodiment of the disclosure.
Figure 2:
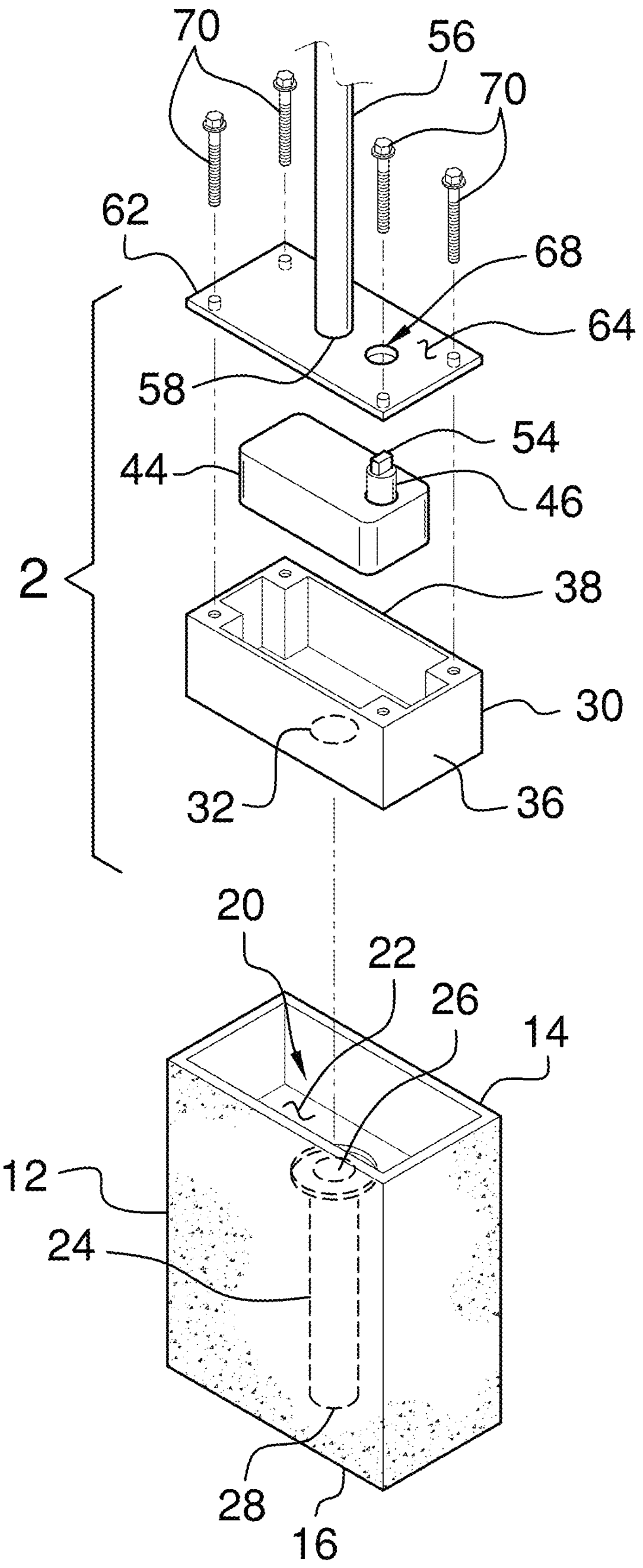
FIG. 2 is an exploded perspective view of an embodiment of the disclosure.
Figure 3:
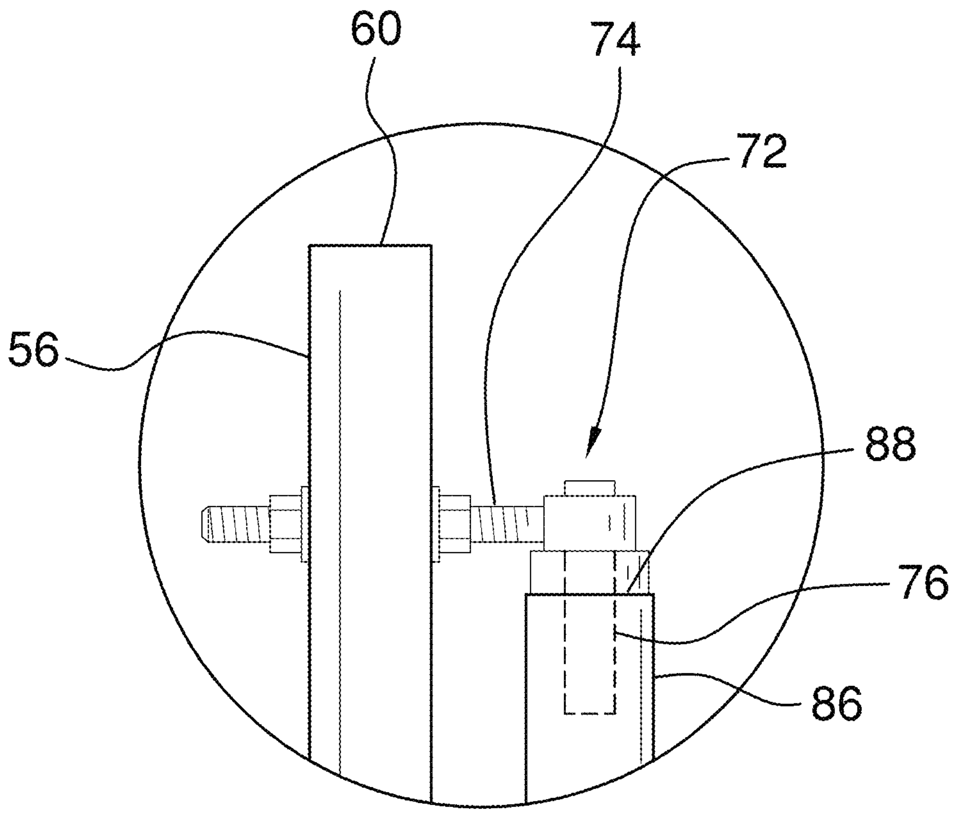
FIG. 3 is a magnified detail view taken from circle 3 of FIG. 1 of an embodiment of the disclosure.
Figure 4:
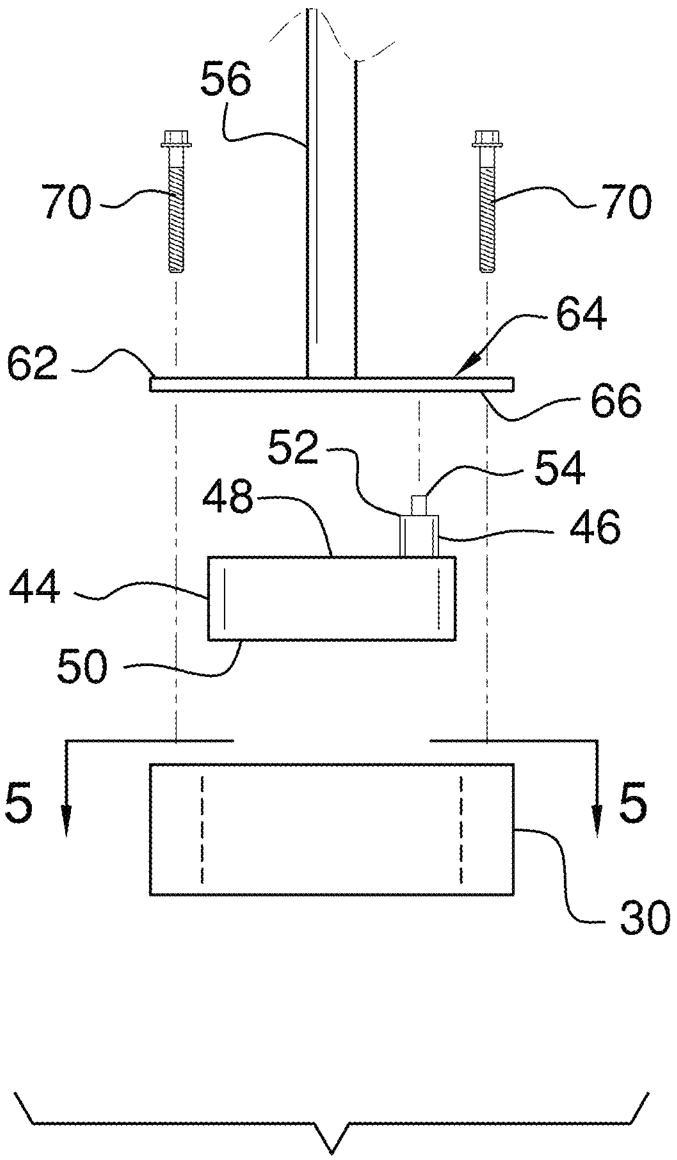
FIG. 4 is a front exploded view of an embodiment of the disclosure.
Figure 5:
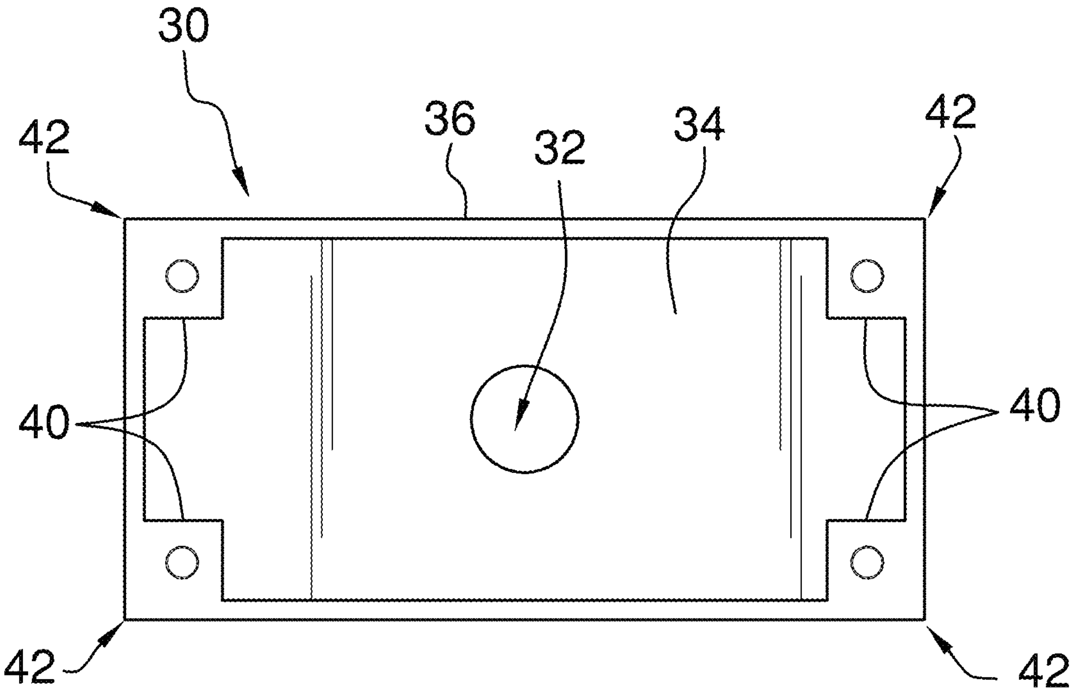
FIG. 5 is a top view of a junction box of an embodiment of the disclosure.

With reference now to the drawings, and in particular to FIGS. 1 through 5 thereof, a new gate closure device embodying the principles and concepts of an embodiment of the disclosure and generally designated by the reference numeral 10 will be described.

As best illustrated in FIGS. 1 through 5, the hydraulic gate closure device 10 generally comprises a vault 12 that is buried underground. The vault 12 has a top end 14 and a bottom end 16; the top end 14 is oriented level with the ground 18. Additionally, the top end 14 has a well 20 extending toward the bottom end 16 and the well 20 has a lower bounding surface 22. The vault 12 may be comprised of concrete or other type of resilient material.

A drain 24 is integrated into the vault 12 to drain fluid 25 from the vault 12. The drain 24 has an upper end 26 and a lower end 28; the upper end 26 extends through the lower bounding surface 22 of the well 20 to receive the fluid 25 from the well 20. Additionally, the drain 24 extends through the bottom end 16 of the vault 12. The lower end 28 of the drain 24 is spaced from the bottom end 16 of the vault 12 such that the lower end 28 drains the fluid 25 into the ground 18. The fluid 25 may be rain water or other type of fluid that may have collected in the vault 12.

A junction box 30 is provided and the junction box 30 is positioned in the vault 12. The junction box 30 has a drain hole 32 to drain the fluid 25 from the junction box 30. Additionally, the drain hole 32 is in fluid communication with the drain 24 in the vault 12 such that the drain 24 in the vault 12 receives the fluid 25 from the drain hole 32 in the junction box 30. The junction box 30 has a bottom wall 34 and a perimeter wall 36 extending upwardly from the bottom wall 34 and the perimeter wall 36 has a distal edge 38 with respect to the bottom wall 34. Furthermore, the perimeter wall 36 has a plurality of receivers 40 each extending between the distal edge 38 of the perimeter wall 36 and the bottom wall 34. Each receiver 40 of the plurality of receivers 40 is positioned in a respective one of four corners 42 of the perimeter wall 36. The bottom wall 34 rests upon the lower bounding surface 22 of the well 20 in the vault 12 and the distal edge 38 of the perimeter wall 36 is aligned with the top end 14 of the vault 12.

A closer 44 is provided and the closer 44 is positioned in the junction box 30. The closer 44 has a knob 46 that is rotatably integrated into the closer 44. Additionally, the knob 46 is biased to rotate in a first direction and the knob 46 is rotatable in a second direction. The closer 44 has an upper wall 48 and a lower wall 50; the knob 46 is positioned on the upper wall 48 and the knob 46 is offset from a center of the upper wall 48. Additionally, the knob 46 has a distal surface 52 with respect to the upper wall 48 and the knob 46 has a tab 54 which is coupled to and extends upwardly from the distal surface 52. Furthermore, the tab 54 bisects the distal surface 52 of the knob 46.

The lower wall 50 rests upon the bottom wall 34 of the junction box 30 and the knob 46 extends upwardly beyond the distal edge 38 of the perimeter wall 36 of the junction box 30. The closer 44 may be a hydraulic door closer of any conventional design that is commonly employed with glass doors in a commercial environment. Additionally, the knob 46 may be biased to rotate in the first direction so long as the knob 46 is not fully rotated in the second direction. Furthermore, the knob 46 may resist rotating when the knob 46 is fully rotated in the second direction such that the knob 46 is not biased to rotate in the first direction.

A pole 56 is coupled to and extends upwardly from the junction box 30 and the pole 56 is vertically oriented. The pole 56 has a bottom end 58 of the pole 56 and a top end 60 of the pole 56. A plate 62 is provided which has an upper surface 64 and a lower surface 66. The bottom end 58 of the pole 56 is coupled to the upper surface 64 and the bottom end 58 of the pole 56 is centrally located on the upper surface 64. Additionally, the plate 62 has a hole 68 extending through the upper surface 64 and the lower surface 66 and the hole 68 is offset from the bottom end 58 of the pole 56. The lower surface 66 rests upon the distal edge 38 of the perimeter wall 36 of the junction box 30 and the knob 46 on the upper wall 48 of the closer 44 extends upwardly through the hole 68.

A plurality of fasteners 70 is provided and each fastener 70 of the plurality of fasteners 70 extends through the upper surface 64 of the plate 62 and the lower surface 66 of the plate 62. Each fastener 70 of the plurality of fasteners 70 engages a respective one of the plurality of receivers 40 in the junction box 30 for attaching the plate 62 to the junction box 30. Furthermore, each fastener 70 of the plurality of fasteners 70 may comprise a bolt 72 or other type of threaded fastener.

A bolt 72 is provided which extends through the pole 56 and the bolt 72 has a first portion 74 which is perpendicular to a second portion 76. The first portion 74 extends laterally through the pole 56. Additionally, the first portion 74 is positioned closer to the top end 60 of the pole 56 than the bottom end 58 of the pole 56. The first portion 74 is oriented perpendicular to the pole 56 and the second portion 76 is oriented parallel to the pole 56. Furthermore, the second portion 76 extends downwardly from the first portion 74.

A stanchion 78 is provided which is vertically oriented on the ground 18. The stanchion 78 is spaced from the pole 56 to define an entry 80 between the stanchion 78 and the pole 56. As is shown in FIG. 1, the stanchion 78 may be secured in the ground 18 with concrete or other type of binding agent. A gate 82 is provided and the gate 82 is coupled to the knob 46 of the closer 44. The gate 82 is located in the entry 80 defined between the stanchion 78 and the pole 56. Furthermore, the gate 82 is positioned in a closed position when the knob 46 is biased to rotate in the first direction and the gate 82 closes the entry 80 when the gate 82 is in the closed position. Conversely, the gate 82 is urgeable into an open position and the gate 82 exposes the entry 80 when the gate 82 is in the open position.

The gate 82 has a frame 84 and the frame 84 has a coupled member 86 which is vertically oriented. The coupled member 86 has an upper end 88 of the coupled member 86 and a lower end 90 of the coupled member 86. Furthermore, the lower end 90 of the coupled member 86 insertably receives the tab 54 on the distal surface 52 of the knob 46 on the closer 44. In addition, the tab 54 inhibits the lower end 90 of the coupled member 86 from freely rotating on the knob 46. The second portion 76 of the bolt 72 is pivotally coupled to the upper end 88 of the coupled member 86. Additionally, the frame 84 extends across the entry 80 when the gate 82 is in the closed position and the frame 84 is displaced from the entry 80 when the gate 82 is in the open position. The gate 82 may be a chain link gate or any other type of gate that is commonly employed for the purposes of security at a home, for example.

In use, the gate 82 is pushed into the open position to facilitate passage through the entry 80. The closer 44 returns the gate 82 to the closed position in a slow and controlled manner when the gate 82 is pushed into the open position. Additionally, the knob 46 on the closer 44 resists rotating in the first direction when the gate 82 is pushed as far as possible into the open position. Thus, the gate 82 will remain in the open position until the gate 82 is pushed to move into the closed position. The closer 44 returns the gate 82 to the closed position in the slow and controlled manner when the gate 82 is pushed to move into the closed position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hydraulic gate closure device for closing a gate in a controlled manner, said device comprising:

a vault being configured to be buried underground;

a drain being integrated into said vault wherein said drain is configured to drain fluid from said vault;

a junction box being positioned in said vault, said junction box having a drain hole wherein said drain hole is configured to drain the fluid from said junction box, said drain hole being in fluid communication with said drain in said vault wherein said drain in said vault is configured to receive the fluid from said drain hole in said junction box;

a closer being positioned in said junction box, said closer having a knob being rotatably integrated into said closer, said knob being biased to rotate in a first direction, said knob being rotatable in a second direction;

a pole being coupled to and extending upwardly from said junction box, said pole being vertically oriented;

a stanchion being configured to be vertically oriented on the ground, said stanchion being spaced from said pole to define an entry between said stanchion and said pole; and a gate being coupled to said knob of said closer, said gate being located in said entry defined between said stanchion and said pole, said gate being positioned in a closed position when said knob is biased to rotate in said first direction, said gate closing said entry when said gate is in said closed position, said gate being urgeable into an open position, said gate exposing said entry when said gate is in said open position.

2. The hydraulic gate closure device according to claim 1, further comprising:

said vault having a top end and a bottom end wherein said top end is configured to be oriented level with the ground;

said top end having a well extending toward said bottom end;

said well having a lower bounding surface;

said drain having an upper end and a lower end;

said upper end extending through said lower bounding surface of said well wherein said upper end is configured to receive the fluid from said well;

said drain extending through said bottom end of said vault; and said lower end of said drain being spaced from said bottom end of said vault wherein said lower end is configured to drain the fluid into the ground.

3. The hydraulic gate closure device according to claim 2, further comprising:

said junction box having a bottom wall and a perimeter wall extending upwardly from said bottom wall;

said perimeter wall having a distal edge with respect to said bottom wall;

said perimeter wall having a plurality of receivers each extending between said distal edge of said perimeter wall and said bottom wall;

each receiver of said plurality of receivers being positioned in a respective one of four corners of said perimeter wall;

said bottom wall resting upon said lower bounding surface of said well in said vault; and said distal edge of said perimeter wall being aligned with said top end of said vault.

4. The hydraulic gate closure device according to claim 3, further comprising:

said closer having a lower wall;

said lower wall resting upon said bottom wall of said junction box; and said knob extending upwardly beyond said distal edge of said perimeter wall of said junction box.

5. The hydraulic gate closure device according to claim 3, further comprising:

a plate having an upper surface and a lower surface;

said plate having a hole extending through said upper surface and said lower surface;

said hole being offset from said bottom end of said pole;

said lower surface resting upon said distal edge of said perimeter wall of said junction box; and said knob on said closer extending upwardly through said hole.

6. The hydraulic gate closure device according to claim 5, further comprising:

a plurality of fasteners;

each fastener of said plurality of fasteners extending through said upper surface of said plate and said lower surface of said plate; and each fastener of said plurality of fasteners engaging a respective one of said plurality of receivers in said junction box for attaching said plate to said junction box.

7. The hydraulic gate closure device according to claim 1, further comprising:

said closer having an upper wall and a lower wall;

said knob being positioned on said upper wall;

said knob being offset from a center of said upper wall;

said knob having a distal surface with respect to said upper wall;

said knob having a tab being coupled to and extending upwardly from said distal surface; and said tab being oriented to bisect said distal surface.

8. The hydraulic gate closure device according to claim 7, further comprising:

said gate having a frame;

said frame having a coupled member being vertically oriented;

said coupled member having an upper end of said coupled member and a lower end of said coupled member;

said lower end of said coupled member insertably receiving said tab on said distal surface of said knob on said closer; and said tab inhibiting said lower end of said coupled member from freely rotating on said knob.

9. The hydraulic gate closure device according to claim 8, further comprising:

a bolt extending through said pole;

said bolt having a first portion being perpendicular to a second portion;

said first portion extending laterally through said pole;

said first portion being oriented perpendicular to said pole;

said second portion of said bolt being oriented parallel to said pole; and said second portion of said bolt extending downwardly from said first portion of said bolt; and said second portion of said bolt being pivotally coupled to said upper end of said coupled member.

10. The hydraulic gate closure device according to claim 8, further comprising:

said frame extending across said entry when said gate is in said closed position; and said frame being displaced from said entry when said gate is in said open position.

11. The hydraulic gate closure device according to claim 1, further comprising:

said pole having a bottom end of said pole and a top end of said pole;

a plate having an upper surface and a lower surface;

said bottom end of said pole being coupled to said upper surface;

said bottom end of said pole being centrally located on said upper surface;

said plate having a hole extending through said upper surface and said lower surface; and said hole being offset from said bottom end of said pole.

12. The hydraulic gate closure device according to claim 1, further comprising:

a bolt extending through said pole;

said bolt having a first portion being perpendicular to a second portion;

said first portion extending laterally through said pole; and said first portion being oriented perpendicular to said pole.

13. The hydraulic gate closure device according to claim 12, further comprising:

said pole having a bottom end of said pole and a top end of said pole;

said first portion of said bolt being positioned closer to said top end of said pole than said bottom end of said pole.

14. The hydraulic gate closure device according to claim 12, further comprising:

said second portion of said bolt being oriented parallel to said pole; and said second portion of said bolt extending downwardly from said first portion of said bolt.

15. A hydraulic gate closure device for closing a gate in a controlled manner, said device comprising:

a vault being configured to be buried underground, said vault having a top end and a bottom end wherein said top end is configured to be oriented level with the ground, said top end having a well extending toward said bottom end, said well having a lower bounding surface;

a drain being integrated into said vault wherein said drain is configured to drain fluid from said vault, said drain having an upper end and a lower end, said upper end extending through said lower bounding surface of said well wherein said upper end is configured to receive the fluid from said well, said drain extending through said bottom end of said vault, said lower end of said drain being spaced from said bottom end of said vault wherein said lower end is configured to drain the fluid into the ground;

a junction box being positioned in said vault, said junction box having a drain hole wherein said drain hole is configured to drain the fluid from said junction box, said drain hole being in fluid communication with said drain in said vault wherein said drain in said vault is configured to receive the fluid from said drain hole in said junction box, said junction box having a bottom wall and a perimeter wall extending upwardly from said bottom wall, said perimeter wall having a distal edge with respect to said bottom wall, said perimeter wall having a plurality of receivers each extending between said distal edge of said perimeter wall and said bottom wall, each receiver of said plurality of receivers being positioned in a respective one of four corners of said perimeter wall, said bottom wall resting upon said lower bounding surface of said well in said vault, said distal edge of said perimeter wall being aligned with said top end of said vault;

a closer being positioned in said junction box, said closer having a knob being rotatably integrated into said closer, said knob being biased to rotate in a first direction, said knob being rotatable in a second direction, said closer having an upper wall and a lower wall, said knob being positioned on said upper wall, said knob being offset from a center of said upper wall, said knob having a distal surface with respect to said upper wall, said knob having a tab being coupled to and extending upwardly from said distal surface, said tab being oriented to bisect said distal surface, said lower wall resting upon said bottom wall of said junction box, said knob extending upwardly beyond said distal edge of said perimeter wall of said junction box;

a pole being coupled to and extending upwardly from said junction box, said pole being vertically oriented, said pole having a bottom end of said pole and a top end of said pole;

a plate having an upper surface and a lower surface, said bottom end of said pole being coupled to said upper surface, said bottom end of said pole being centrally located on said upper surface, said plate having a hole extending through said upper surface and said lower surface, said hole being offset from said bottom end of said pole, said lower surface resting upon said distal edge of said perimeter wall of said junction box, said knob on said upper wall of said closer extending upwardly through said hole;

a plurality of fasteners, each fastener of said plurality of fasteners extending through said upper surface of said plate and said lower surface of said plate, each fastener of said plurality of fasteners engaging a respective one of said plurality of receivers in said junction box for attaching said plate to said junction box;

a bolt extending through said pole, said bolt having a first portion being perpendicular to a second portion, said first portion extending laterally through said pole, said first portion being positioned closer to said top end of said pole than said bottom end of said pole, said first portion being oriented perpendicular to said pole, said second portion being oriented parallel to said pole, said second portion extending downwardly from said first portion;

a stanchion being configured to be vertically oriented on the ground, said stanchion being spaced from said pole to define an entry between said stanchion and said pole; and a gate being coupled to said knob of said closer, said gate being located in said entry defined between said stanchion and said pole, said gate being positioned in a closed position when said knob is biased to rotate in said first direction, said gate closing said entry when said gate is in said closed position, said gate being urgeable into an open position, said gate exposing said entry when said gate is in said open position, said gate having a frame, said frame having a coupled member being vertically oriented, said coupled member having an upper end of said coupled member and a lower end of said coupled member, said lower end of said coupled member insertably receiving said tab on said distal surface of said knob on said closer, said tab inhibiting said lower end of said coupled member from freely rotating on said knob, said second portion of said bolt being pivotally coupled to said upper end of said coupled member, said frame extending across said entry when said gate is in said closed position, said frame being displaced from said entry when said gate is in said open position.

* * * * *